Sept. 22, 1964     O. A. JENSEN     3,150,158
PROCESS FOR MANUFACTURING SOAP
Filed Sept. 25, 1961
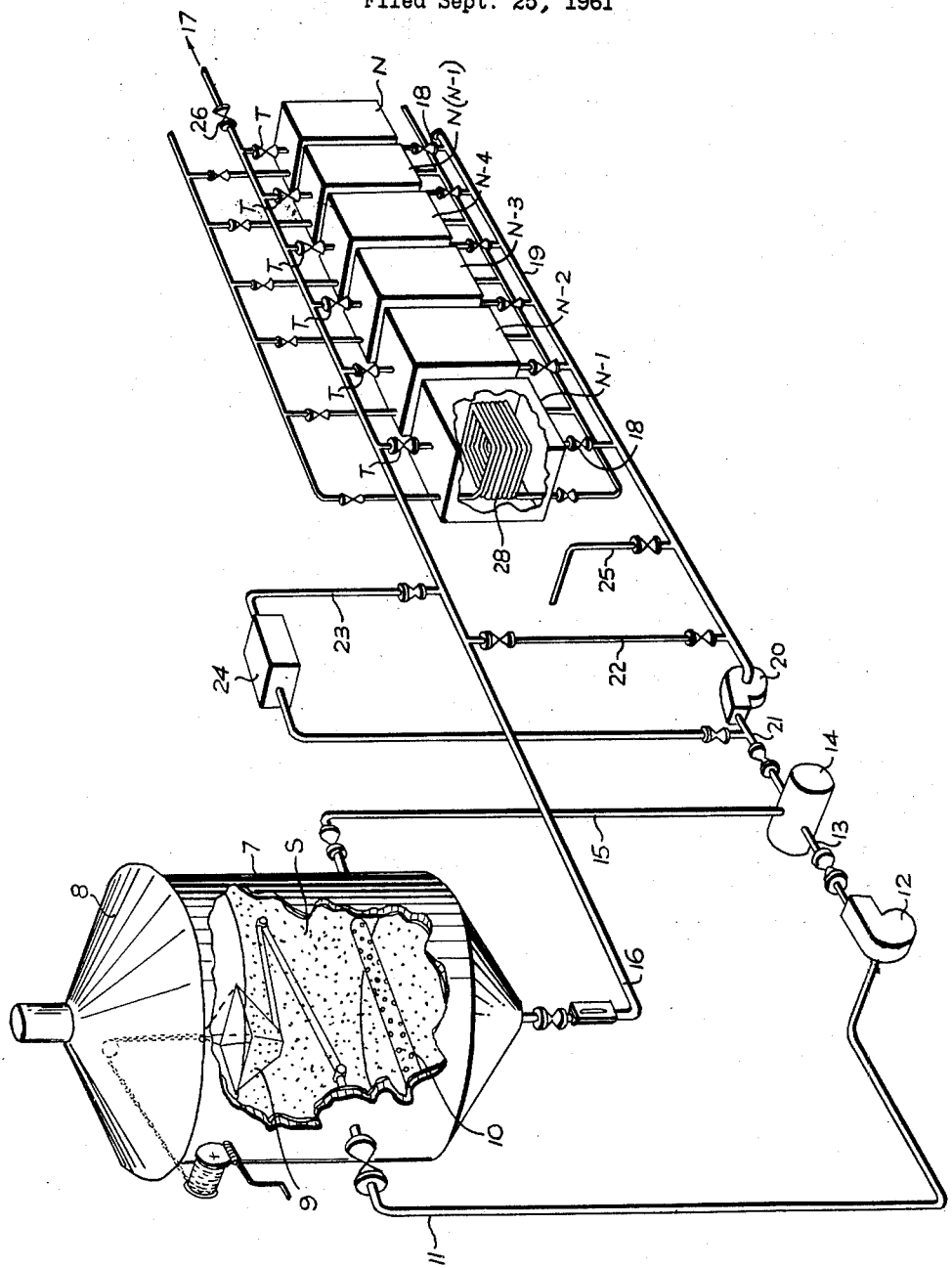
Inventor
OVE ANDREAS JENSEN
By Toulmin & Toulmin
Attorneys

3,150,158
PROCESS FOR MANUFACTURING SOAP
Ove Andreas Jensen, Radcliffe-on-Trent, England, assignor to The Union International Company Limited
Filed Sept. 25, 1961, Ser. No. 140,602
Claims priority, application Great Britain, Oct. 1, 1960, 33,764/60
2 Claims. (Cl. 260—419)

The present invention is concerned with improvements in the process for manufacturing soap, of the kind (herein after referred to as the kind defined) in which fat is saponified in a soap pan, the crude soap thereby produced grained with salt, and the resulting crude soap curd washed with a wash liquor, and with plant for use therein.

It is an object of the present invention to provide improvements in a process of the kind hereinbefore defined for manufacturing soap, and in the plant.

This invention relates to the application of a multi-stage batch counter-current wash system to a single soap pan using inexpensive items of plant, with a view to achieving the advantages of a counter-current system as applied to washing of soap and to increasing the potential output of the soap pan as compared with the output obtainable by the conventional soap boiling operation. The invention may also incorporate provision for speedy saponification of neutral fats, interstage filtration of the wash liquid to extract a greater quantity of impurities from the soap and wash liquor, and for re-cycling of nigre.

After the saponification stage in conventional soap boiling the soap curd is given a number of washing operations each wash requiring approximately 24 hours to complete, as the wash liquor has to be thoroughly mixed with the soap by boiling and agitation with steam. After completing the mixing stage the contents of the soap pan is allowed to settle and separate into two layers, the top layer being the soap, the bottom layer the wash liquor containing some of the impurities and glycerine from the soap. The settled bottom layer is withdrawn from the soap pan for treatment and evaporation in the glycerine department to recover the glycerine and the soap left in the soap pan is ready for the next wash. Each successive wash will contain a progressively smaller percentage of glycerine and impurities. After the final wash the soap is fitted and settled, the resultant neat soap withdrawn and the nigre is left in the soap pan.

The nigre left in the soap pan may or may not require purification before the soap pan is ready to receive the next fat charge for saponification. Generally it is not practicable to reduce the cycle of operation below a period of 5–6 days and in most cases the cycle is longer.

This process is wasteful, as the lye bulk produced is large if a high extraction efficiency of glycerol is desired and conversely if a small lye bulk is produced the extraction efficiency of glycerol is low. Furthermore, as the pan cycle occupies several days the steam consumption is high. In the ordinary counter-current system as described by Davidsohn, Better & Davidsohn in "Soap Manufacture" vol. 1 (published by Interscience Publishers Incorporated, New York) some of these disadvantages are eliminated, but although the lye bulk is reduced without impairing the glycerol extraction efficiency the steam consumption of the system is, under ordinary circumstances, only slightly reduced, as the pan cycle covers a period of 8 days. A disadvantage to the small and medium sized soap factory is the fact that such a counter-current system will require a number ($n$) of soap pans of equal capacity for a number ($n-1$) of washes and the flexibility of the system in regard to handling soap from different fat charges at short notice is very poor.

The method covered by this invention is particularly suitable for the small and medium sized factory as the cost of additional plant and equipment is comparatively low, but it could equally be applied to soap factories of any size.

The present invention provides, in a process of the kind defined, for manufacturing soap and in which successive batches of crude soap curd are washed with wash liquor, the steps of washing each batch in a plurality of successive stages by the use, in at least a plurality of the stages, of spent wash liquors from washing stages of a previous batch, passing the spent wash liquors from one stage for glycerine recovery, and reserving the spent wash liquors from a plurality of the stages for re-use in the washing stages of a succeeding batch. Fresh wash liquor may be used in one of the washing stages of each batch; alternatively fresh wash liquor may be added at each of at least some of the successive stages.

The crude soap curd contains glycerine which is extracted therefrom by said wash liquor during the washing stages, and the washing of said crude soap curd is continued until an acceptable amount of glycerine has been extracted.

It is preferred in the present invention to withdraw the crude soap curd from a region in the soap pan near to the surface of the curd and this way be conveniently effected by means of a tundish appropriately positioned in the soap pan. The curd withdrawn through the tundish is thoroughly and intimately mixed with wash liquor and the mixture thereafter allowed to settle-out to form two layers the lower of which consists of spent wash liquor and the upper of which consists of washed soap curd. The mixture formed by admixing crude soap curd and wash liquor may be introduced into the lower portion of the soap pan and allowed to settle-out therein, the spent wash liquor separating out at the lower layer at the bottom of the soap pan from where it may be withdrawn for subsequent use.

In one aspect of the present invention spent wash liquor resulting from certain washing stages is not employed in the next succeeding washing stage but is held for use in washing a subsequent batch of curd. For example in a washing operation conducted on a batch of crude soap curd and comprising a succession of washing stages, the following procedure may be adopted. In each washing stage other than the last, there is used spent wash liquor resulting from a previous washing stage, the successive washing stages other than the last being carried out with liquors having a progressively-decreasing concentration of glycerine owing to said liquors having already been used a progressively-decreasing number of times; the last washing stage is carried out with fresh liquor: after each washing stage the mixture of soap curd and wash liquor is returned to the soap pan for the wash liquor (enriched with glycerine) to settle out and the spent wash liquor is then withdrawn from the soap pan; after each washing stage other than the first the withdrawn liquor is held for use in washing a subsequent batch of curd; after the first washing stage the withdrawn liquor (having a maximum glycerine concentration) is passed for glycerine recovery. By operating in the manner, in a process having a total of $n$ washing stages, there may be obtained at the $n$th stage a series of spent washes varying from one which has been used in $(N-1)$ stages to one which has been used in $(n-(n-1))$ stages (i.e. in one stage only), each spent wash as the series is descended having been used in one less stage than the one immediately above it in the series, and in the preferred embodiment of the present invention such a series of spent wash liquors is employed in washing the next batch of crude soap curd. Thus at the first washing stage the crude soap curd withdrawn from the soap pan is washed with the spent liquor which has already been used in $(n-1)$ stages, the resulting spent wash being treated to recover glycerine therefrom. At the second washing stage the crude soap curd is washed with the spent wash which has already been used in $(n-2)$ stages, (the spent liquor resulting from this washing stage then having been used in a total of $(n-1)$ washing stages). At the third washing stage the crude soap curd is washed with spent liquor which has already been used in $(n-3)$ washing stages (the spent liquor resulting from this third washing stage then having been used in a total of $(n-2)$ washing stages). The process is continued in this manner until at the $n$th washing stage the crude soap curd is washed with fresh wash liquor, the resulting spent wash providing the spent wash which has been used in just one stage, to complete the series of spent washes required for washing the next batch of crude soap curd from the same soap pan. It will be seen that by operating in this way fresh wash liquor is introduced only one every $n$th stage.

This invention also provides, in a soap manufacturing plant, the combination with a soap pan, of a series of holding tanks for wash liquor, connections for discharging spent wash liquor from the pan into any selected tank or for passing said wash liquor for glycerine recovery, a mixer for mixing soap and from the pan and washing liquor from the tanks and a connection for supplying the mixture to the pan, a pump and connections for withdrawing the soap curd from the pan and supplying it to the mixer, and a pump and connections for withdrawing wash liquor from any selected tank and supplying it to the mixer.

The invention will now be further described with reference to the accompanying drawing in which there is shown in diagrammatic form, plant which may be employed in carrying out the process of the invention.

Referring to the drawing it will be seen that soap pan 7 contains crude soap curd S and is provided with a cover 8, a vertically-adjustable tundish 9, and a diffusor 10 through which the mixture of soap curd and wash liquor may be introduced into the lower portion of the soap pan. Tundish 9 is connected by a valved conduit 11 to a pump 12 from which a valved conduit 13 leads to a mechanical mixer 14 which is connected by valved conduit 15 to diffuser 10. The foot of the pan 7 is provided with an outlet conduit 16 leading by way of shut-off valve 26 to the glycerine department indicated by arrow 17, which conduit is provided with a number of taps T through which wash liquor can be drawn off into holding tanks $n-1$ to $(n-(n-1))$ respectively which tanks contain a series of spent wash liquors $Ln-1$ to $L(n-(n-1))$ the holding tank $n$ containing fresh wash liquor $Ln$. Each holding tank is provided with a valved outlet conduit 18 which opens into a conduit 19 leading to a pump 20 which is connected by a valved conduit 21 to the mixer 14.

Provision is also made, in a valved conduit 22, for passing wash liquor from the soap pan 7 directly to the input side of pump 20 at will. A purification circuit is provided by valved conduit 23 and purifier 24 (e.g. a filter or centrifuge) for removing impurities, and the valved conduit 25 enable nigre from a nigre tank to be recycled to the soap pan.

After saponification and graining with dry salt, withdrawal of the resultant soap curd is commenced at the surface of the curd through tundish 9 by pump 12 and the withdrawn curd is pumped through mixer 14. Simultaneously, wash liquor $Ln-1$ from tank $n-1$ is pumped by pump 20 through mixer 14, where the curd and wash liquor are thoroughly mixed. The mixture is discharged from the mixer to the soap pan 7 via diffusor 10, the rates of flow of the two liquids being adjusted so as to alloy the entire mass of soap to pass through the mixer by the time tank $n-1$ is empty.

The mixture after discharge through the diffuser 10 will separate into two layers, the top being the washed curd and the bottom the wash liquor further enriched in glycerine. The flow through pumps 12 and 20 is temporarily stopped while the spent wash liquor from the first washing containing glycerol and impurities from the soap is discharged through conduit 16 to the glycerine department 17. The washing process is thereafter continued in a similar manner with wash liquor $Ln-2$ from tank $n-2$, but the resulting spent wash liquor is discharged into tank $n-1$ to be held for use in the first washing stage to be carried out on the next batch of crude soap curd. The third wash stage is carried out, in a similar manner, with liquor $Ln-3$ from tank $n-3$ and the resulting spent wash liquor is discharged into tank $n-2$ to be held for use in the second washing stage to be carried out on the said next batch of crude soap curd. The washing process is repeated, using liquor from each tank in turn, until the $n$th stage has been completed and the spent wash resulting from it discharged into tank $n-1$: tank $n$ is now empty, ready to receive a fresh batch of wash liquor. During the washing operations the baches of wash liquor are desirably maintained at a temperature of 90–95° C. (by means indicated as an example in the case of tank $n-1$ at 28, all the tanks being equipped with like means) but no steam is fed to the soap pan.

Under certain circumstances it will be of benefit to recirculate the wash liquor from the bottom of the pan 7 through pump 20 either simultaneously with feeding a batch of wash liquor from the wash tank or after this operation is completed, with a view to increasing the wash liquor/soap content ratio: it may also be mentioned that a single pump may be employed in place of the two separate pumps 12 and 20.

The washed soap left in the pan is submitted in a conventional manner to a fitting operation and finally discharged as fitted soap for ordinary finishing processes. The nigre is removed from the pan to storage and re-introduced with succeeding washing operations towards the end but before the final wash. The wash liquors in the tanks can be filtered or purified individually through purification system 23 to remove impurities contained therein from previous operations, in order to avoid accumulation and re-cycling of such impurities.

It will be appreciated that the various conduits are provided with shut-off valves or cocks that are shown in conventional manner in the drawing: as for example at T and at 18 and 26. These valves or cocks require no further illustration or description.

The method described has the foregoing features:

(1) It is a comparatively inexpensive method of applying a counter-current washing system to a single soap pan.

(2) Advantages, including low lye bulk and high efficiency in glycerine extraction, of a counter-current washing system are obtained with an improved steam consumption.

(3) The time required to carry out the washing operation is considerably reduced as contrasted with conventional methods.

(4) The potential output from a soap pan is considerably increased.

(5) Re-cycling of nigre is possible.

(6) Removal of impurities from the washing system during operation is possible.

(7) Flexibility of a pan room in respect of the handling of different charges is improved.

As an alternative to the method of saponification and graining with dry salt described it is preferred to saponify the fat charge with the liquor from $Ln-1$ which, prior to operation, is made sufficiently alkaline to ensure complete saponification. In this alternative method the fat charge is either withdrawn from the pan through tundish 9 and pumped to mixer 14 or pumped direct from storage by separate connection to mixer 14 and simultaneously the alkaline liquor from L$n$—1 is pumped via pump 20 to mixer 14 where the fat charge and liquor are continuously mixed. Saponification starts immediately in the mixer and the resultant crude soap mixture is discharged into the pan via diffuser 10. The mixture in the pan separates into two layers, the top being the curd and the bottom the glycerine enriched wash liquor to be passed to glycerine department. Subsequent washes are carried out as described in previous method. This alternative method ensures a higher percentage of glycerol in the wash liquor being passed to the glycerine department.

What I claim is:

1. In a soap-manufacturing process, a multi-stage batch countercurrent wash system employing a single soap pan in which successive batches of crude soap curd are washed with wash liquor and comprising the steps of washing each batch in said pan in a plurality of stages by the use, in at least a plurality of the stages, of spent wash liquors from washing stages of a previous batch, passing the spent wash liquor from one stage for glycerine recovery, and reserving the spent wash liquors from a plurality of the stages for re-use in the washing stages of a succeeding batch, wherein in each stage the crude soap curd is withdrawn from the soap pan and mixed with wash liquor, the mixture is reduced to the soap pan and is allowed to settle out therein into an upper layer of washed, crude, soap curd and a lower layer of spent wash liquor enriched with glycerine, and the spent wash liquor of the lower layer is withdrawn, and wherein the successive washing stages other than the last are carried out with liquors having a progressively-decreasing concentration of glycerine owing to said liquors having been used a progressively-decreasing number of times, and the last washing stage is carried out with fresh liquor.

2. In a soap-manufacturing process, a multi-stage batch countercurrent wash system employing a single soap pan in which successive batches of crude soap curd are washed with wash liquor and comprising the steps of washing each batch in said pan in a plurality of successive stages by the use, in all successive stages other than the last, of spent wash liquors from washing stages of a previous batch and by the use of fresh wash liquor in the last stage, the spent wash liquors used in said successive stages other than the last having a progressively-decreasing concentration of glycerine owing to said liquors having already been used a progressively-decreasing number of times, passing the spent wash liquor from the first stage for glycerine recovery, and reserving the spent wash liquors from all stages other than the first for re-use in the washing stages of a succeeding batch, wherein in each stage the crude soap curd is withdrawn from the soap pan and mixed with wash liquor, the mixture is returned to the soap pan and is allowed to settle out therein into an upper layer of washed, crude, soap curd and a lower layer of spent wash liquor enriched with glycerine, and the spent wash liquor of the lower layer is withdrawn.

References Cited in the file of this patent

UNITED STATES PATENTS

| | | |
|---|---|---|
| 2,005,447 | Wuster | June 18, 1935 |
| 2,562,207 | Owen | July 31, 1951 |
| 2,653,958 | Lachampt | Sept. 29, 1953 |

FOREIGN PATENTS

| | | |
|---|---|---|
| 469,427 | Canada | Nov. 14, 1950 |
| 683,529 | Great Britain | Dec. 3, 1952 |